United States Patent
Ponasik, Jr. et al.

[11] Patent Number: 6,117,959
[45] Date of Patent: Sep. 12, 2000

[54] POLYOLEFIN CATALYSTS

[75] Inventors: James Allen Ponasik, Jr.; Peter Borden Mackenzie, both of Kingsport; Christopher Moore Killian, Gray, all of Tenn.

[73] Assignee: Eastman Chemical Company, Kingsport, Tenn.

[21] Appl. No.: 09/145,530

[22] Filed: Sep. 2, 1998

[51] Int. Cl.$^7$ ...................................................... C08F 4/80
[52] U.S. Cl. .......................... 526/172; 526/161; 526/352; 526/129; 556/35; 556/137; 556/138; 502/104; 502/117; 502/152; 502/162; 502/233
[58] Field of Search ..................................... 526/172, 159, 526/160, 161, 348.6, 352, 129; 556/35, 137, 138

[56] References Cited

U.S. PATENT DOCUMENTS

| | | |
|---|---|---|
| 4,689,437 | 8/1987 | Murray . |
| 4,691,036 | 9/1987 | Heinz et al. . |
| 4,716,138 | 12/1987 | Murray . |
| 4,716,205 | 12/1987 | Klabunde . |
| 4,724,273 | 2/1988 | Fink et al. . |
| 4,906,754 | 3/1990 | Klabunde . |
| 5,030,606 | 7/1991 | Klabunde . |
| 5,175,326 | 12/1992 | Klabunde . |
| 5,714,556 | 2/1998 | Johnson et al. . |
| 5,852,145 | 12/1998 | McLain et al. . |
| 5,852,146 | 12/1988 | Reichle et al. ............................ 526/172 |
| 5,866,663 | 2/1999 | Brookhart et al. . |
| 5,880,241 | 3/1999 | Brookhart et al. . |
| 5,880,323 | 3/1999 | Brookhart et al. . |

FOREIGN PATENT DOCUMENTS

| | | |
|---|---|---|
| 381495 | 1/1990 | European Pat. Off. . |
| 9-255712 | 3/1996 | Japan . |
| 96-70332 | 3/1996 | Japan . |
| 96-84343 | 4/1996 | Japan . |
| 96-84344 | 4/1996 | Japan . |
| 9-272709 | 10/1997 | Japan . |
| 9-272713 | 10/1997 | Japan . |
| WO96/23010 | 8/1996 | WIPO . |
| WO 96/37523 | 11/1996 | WIPO . |
| WO96/37522 | 11/1996 | WIPO . |
| WO9637522 | 11/1996 | WIPO . |
| WO9637523 | 11/1996 | WIPO . |
| WO97/02298 | 1/1997 | WIPO . |
| WO97/17380 | 5/1997 | WIPO . |
| WO97/38024 | 10/1997 | WIPO . |
| WO97/48735 | 10/1997 | WIPO . |
| WO97/48735 | 12/1997 | WIPO . |
| WO97/48736 | 12/1997 | WIPO . |
| WO97/48737 | 12/1997 | WIPO . |
| WO97/48742 | 12/1997 | WIPO . |
| WO98/03521 | 1/1998 | WIPO . |
| WO98/035559 | 1/1998 | WIPO . |
| WO98/30610 | 7/1998 | WIPO . |
| WO9830610 | 7/1998 | WIPO . |
| WO98/42664 | 10/1998 | WIPO . |
| WO98/42665 | 10/1998 | WIPO . |
| WO98/47934 | 10/1998 | WIPO . |
| WO9842664 | 10/1998 | WIPO . |
| WO9842665 | 10/1998 | WIPO . |
| WO9847934 | 10/1998 | WIPO . |
| WO98/56832 | 12/1998 | WIPO . |
| WO98/56837 | 12/1998 | WIPO . |
| WO98/56839 | 12/1998 | WIPO . |
| WO9856832 | 12/1998 | WIPO . |
| WO9856837 | 12/1998 | WIPO . |
| WO9856839 | 12/1998 | WIPO . |
| WO99/02472 | 1/1999 | WIPO . |
| WO9902472 | 1/1999 | WIPO . |
| WO99/05189 | 2/1999 | WIPO . |
| WO99/09078 | 2/1999 | WIPO . |
| WO9905189 | 2/1999 | WIPO . |
| WO9909078 | 2/1999 | WIPO . |

OTHER PUBLICATIONS

L. K. Johnson, et al., J. Am. Chem. Soc., 1995, 117, 6414.
G. F. Schmidt et al., J. Am. Chem. Soc. 1985, 107, 1443.
M. Brookhart et al, Macromolecules 1995, 28, 5378.
M. Peuckert et al., Organomet. 1983, 2(5), 594.
W. Keim et al., Angew. Chem. Int. Ed. Eng. 1981, 20, 116.
V. M. Mohring et al., Angew. Chem. Int. Ed. Eng. 1985, 24, 1001.
G. Wilke, Angew. Chem. Int. Ed. Engl. 1988, 27, 185.
K.A.O. Starzewski et al., Angew. Chem. Int. Ed. Engl. 10987, 26, 63.

*Primary Examiner*—David W. Wu
*Assistant Examiner*—R. Harlan
*Attorney, Agent, or Firm*—Jonathan D. Wood; Bernard J. Graves, Jr.; Harry J. Gwinnell

[57] ABSTRACT

This invention is directed to novel Group 8–10 transition metal catalysts and to batch or continuous polymerizations using these catalysts. The catalysts of the present invention readily convert ethylene and α-olefins to high molecular weight polymers, and allow for olefin polymerizations under various conditions, including ambient temperature and pressure, and in solution. Preferred catalysts are group 8–10 transition metals having certain dipyridyl ligands bonded thereto.

36 Claims, No Drawings

POLYOLEFIN CATALYSTS

FIELD OF THE INVENTION

The present invention is directed to Group 8–10 transition metal-containing complexes and their use in olefin polymerizations.

BACKGROUND OF THE INVENTION

Olefin polymers are used in a wide variety of products, from sheathing for wire and cable to film. Olefin polymers are used, for instance, in injection or compression molding applications, in extruded films or sheeting, as extrusion coatings on paper, for example photographic paper and digital recording paper, and the like. Improvements in catalysts have made it possible to better control polymerization processes, and, thus, influence the properties of the bulk material. Increasingly, efforts are being made to tune the physical properties of plastics for lightness, strength, resistance to corrosion, permeability, optical properties, and the like, for particular uses. Chain length, polymer branching and functionality have a significant impact on the physical properties of the polymer. Accordingly, novel catalysts are constantly being sought in attempts to obtain a catalytic process for polymerizing olefins which permits more efficient and better controlled polymerization of olefins.

Conventional polyolefins are prepared by a variety of polymerization techniques, including homogeneous liquid phase, gas phase, and slurry polymerization. Certain transition metal catalysts, such as those based on titanium compounds (e.g. $TiCl_3$ or $TiCl_4$) in combination with organoaluminum cocatalysts, are used to make linear and linear low density polyethylenes as well as poly-α-olefins such as polypropylene. These so-called "Ziegler-Natta" catalysts are quite sensitive to oxygen and are ineffective for the copolymerization of nonpolar and polar monomers.

Recent advances in non-Ziegler-Natta olefin polymerization catalysis include the following.

L. K. Johnson et al., WO Patent Application 96/23010, disclose the polymerization of olefins using cationic nickel, palladium, iron, and cobalt complexes containing diimine and bisoxazoline ligands. This document also describes the polymerization of ethylene, acyclic olefins, and/or selected cyclic olefins and optionally selected unsaturated acids or esters such as acrylic acid or alkyl acrylates to provide olefin homopolymers or copolymers.

European Patent Application Serial No. 381,495 describes the polymerization of olefins using palladium and nickel catalysts which contain selected bidentate phosphorous containing ligands.

L. K. Johnson et al., *J. Am. Chem. Soc.*, 1995, 117, 6414, describe the polymerization of olefins such as ethylene, propylene, and 1-hexene using cationic α-diimine-based nickel and palladium complexes. These catalysts have been described to polymerize ethylene to high molecular weight branched polyethylene. In addition to ethylene, Pd complexes act as catalysts for the polymerization and copolymerization of olefins and methyl acrylate.

G. F. Schmidt et al., *J. Am. Chem. Soc.* 1985, 107, 1443, describe a cobalt(III) cyclopentadienyl catalytic system having the structure $[C_5Me_5(L)CoCH_2CH_2\text{---}\mu\text{---}H]^+$, which provides for the "living" polymerization of ethylene.

M. Brookhart et al., *Macromolecules* 1995, 28, 5378, disclose using such "living" catalysts in the synthesis of end-functionalized polyethylene homopolymers.

U. Klabunde, U.S. Pat. Nos. 4,906,754, 4,716,205, 5,030,606, and 5,175,326, describes the conversion of ethylene to polyethylene using anionic phosphorous, oxygen donors ligated to Ni(II). The polymerization reactions were run between 25 and 100° C. with modest yields, producing linear polyethylene having a weight-average molecular weight ranging between 8K and 350K. In addition, Klabunde describes the preparation of copolymers of ethylene and functional group containing monomers.

M. Peuckert et al., *Organomet.* 1983, 2(5), 594, disclose the oligomerization of ethylene using phosphine, carboxylate donors ligated to Ni(II), which showed modest catalytic activity (0.14 to 1.83 TO/s). The oligomerizations were carried out at 60 to 95° C. and 10 to 80 bar ethylene in toluene, to produce linear α-olefins.

R. E. Murray, U.S. Pat. Nos. 4,689,437 and 4,716,138, describes the oligomerization of ethylene using phosphine, sulfonate donors ligated to Ni(II). These complexes show catalyst activities approximately 15 times greater than those reported with phosphine, carboxylate analogs.

W. Keim et al., *Angew. Chem. Int. Ed. Eng.* 1981, 20, 116, and V. M. Mohring, et al., *Angew. Chem. Int. Ed. Eng.* 1985, 24, 1001, disclose the polymerization of ethylene and the oligomerization of α-olefins with aminobis(imino) phosphorane nickel catalysts; G. Wilke, *Angew. Chem. Int. Ed. Engl.* 1988, 27, 185, describes a nickel allyl phosphine complex for the polymerization of ethylene.

K. A. O. Starzewski et al., *Angew. Chem. Int. Ed. Engl.* 1987, 26, 63, and U.S. Pat. No. 4,691,036, describe a series of bis(ylide) nickel complexes, used to polymerize ethylene to provide high molecular weight linear polyethylene.

WO Patent Application 97/02298 discloses the polymerization of olefins using a variety of neutral N, O, P, or S donor ligands, in combination with a nickel(0) compound and an acid.

Brown et al., WO 97/17380, describes the use of Pd α-diimine catalysts for the polymerization of olefins including ethylene in the presence of air and moisture.

Fink et al., U.S. Pat. No. , 4,724,273, have described the polymerization of α-olefins using aminobis(imino) phosphorane nickel catalysts and the compositions of the resulting poly(α-olefins).

Recently Vaughan et al., WO 97/48736, Denton et al., WO 97/48742, and Sugimura et al., WO 97/38024 have described the polymerization of ethylene using silica supported α-diimine nickel catalysts.

Additional recent developments are described by Sugimura et al., in JP96-84344, JP96-84343, by Yorisue et al., in JP96-70332, by Canich et al., WO 97/48735, McLain et al., WO 98/03559, Weinberg et al., WO 97/48521 and by Matsunaga et al., WO 97/48737.

Notwithstanding these advances in non-Ziegler-Natta catalysis, there remains a need for efficient and effective Group 8–10 transition metal catalysts for effecting polymerization of olefins. In addition, there is a need for novel methods of polymerizing olefins employing such effective Group 8–10 transition metal catalysts. In particular, there remains a need for Group 8–10 transition metal olefin polymerization catalysts with both improved temperature stability and functional group compatibility. Further, there remains a need for a method of polymerizing olefins utilizing effective Group 8–10 transition metal catalysts in combination with a Lewis acid so as to obtain a catalyst that is more active and more selective.

SUMMARY OF THE INVENTION

The present invention is directed to novel Group 8–10 transition metal catalysts and to batch or continuous polymerizations using these catalysts. The catalysts used in the processes of the present invention readily convert ethylene and α-olefins to high molecular weight polymers, and allow for olefin polymerizations under various conditions, including ambient temperature and pressure, and in solution. Preferred catalysts include certain dipyridyl ligands coordinated to Group 8–10 transition metals.

The catalysts and processes of the present invention are useful in the preparation of homopolymers of olefins, such as polyethylene, polypropylene, and the like, and olefin copolymers. As an example, ethylene homopolymers can be prepared with strictly linear to highly branched structures by variation of the catalyst structure, cocatalyst composition, and reaction conditions, including pressure and temperature. The effect these parameters have on polymer structure is described herein. These polymers and copolymers have a wide variety of applications, including use as packaging materials and in adhesives.

DETAILED DESCRIPTION OF THE INVENTION

The present invention provides a process for the polymerization of olefins, comprising contacting one or more monomers selected from compounds of the formula $R^1CH=CHR^2$ with a catalyst comprising (a) a Ni(II) Pd(II), Co(II), or Fe(II) metal atom, (b) a ligand of the formula I, and optionally (c) a Bronsted or Lewis acid,

I wherein $R^1$ and $R^2$ are each, independently, hydrogen, hydrocarbyl, or fluoroalkyl, and may be linked to form a cyclic olefin;

$L^1$ and $L^2$ are each, independently, a 5- or 6-membered, monodentate N-donor, heterocyclic ring connected to Q at the position adjacent to the donor nitrogen; and Q is a group of the formula —C(Y)(Z)— wherein Z is H or a heteroatom connected monoradical and Y is hydrocarbyl or substituted hydrocarbyl.

In the above process, it should be appreciated that the Group 8–10 transition metal has coordinated thereto a bidentate ligand having the formula I and that component (c) is optionally reacted with this metal-ligand complex.

As a further aspect of the invention, there is provided a process for the polymerization of olefins, comprising contacting one or more monomers of the formula $R^1CH=CHR^2$ with a catalyst of formula II:

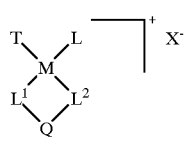

II wherein $R^1$ and $R^2$ are each, independently, hydrogen, hydrocarbyl, or fluoroalkyl, and may be linked to form a cyclic olefin;

$L^1$ and $L^2$ are each, independently, a 5- or 6-membered, monodentate N-donor, heterocyclic ring connected to Q at the position adjacent to the donor nitrogen;

Q is a group of the formula —C(Y)(Z)— wherein Z is H or a heteroatom connected monoradical and Y is hydrocarbyl or substituted hydrocarbyl;

T is hydrogen or hydrocarbyl;

L is a mono-olefin or a neutral Lewis base wherein the coordinated atom is nitrogen, oxygen, or sulfur;

M is Ni(II), Pd(II), Co(II), or Fe(II); and $X^-$ is a weakly coordinating anion.

We believe that when T is hydrogen or hydrocarbyl and L is ethylene or a mono-olefin in formula II above, then II is the catalytically active species. This active specie can be prepared by a number of different methodologies, including reaction of a zero-valent metal complex with a ligand of formula I and a Bronsted acid in the presence of ethylene or a mono-olefin. An example of this methodology includes the reaction of bis(cyclooctadiene)Ni(O) with a bidentate ligand of formula I and hydrogen tetrakis[3,5-(bistrifluoromethyl)phenyl]borate in the presence of ethylene or a mono-olefin to generate an active catalyst of formula II.

In a further aspect of the invention, there is provided a process for the polymerization of olefins, comprising contacting one or more monomers of the formula $R^1CH=CHR^2$ with a catalyst formed by combining a compound of formula III:

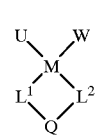

III with a compound A, wherein $R^1$ and $R^2$ are each, independently, H, hydrocarbyl, or fluoroalkyl, and may be linked to form a cyclic olefin;

$L^1$ and $L^2$ are each, independently, a 5- or 6-membered, monodentate N-donor, heterocyclic ring connected to Q at the position adjacent to the donor nitrogen;

Q is a group of the formula —C(Y)(Z)— wherein Z is H or a heteroatom connected monoradical and Y is hydrocarbyl or substituted hydrocarbyl;

U is alkyl, chloride, iodide or bromide;

W is alkyl, chloride, iodide or bromide;

M is Ni(II), Pd(II), Co(II), or Fe(II); and,

A is selected from the group consisting of a neutral Lewis acid capable of abstracting $U^-$ or $W^-$ to form a weakly coordinating anion, a cationic Lewis acid whose counterion is a weakly coordinating anion, and a Bronsted acid whose conjugate base is a weakly coordinating anion.

As a further example of a methodology useful to prepare the catalytically active specie II includes, when U and W are both independently bromide, the complex III can be reacted with a compound A (e.g., an alkyl aluminum specie, such as methylaluminoxane (MAO)), in the presence of ethylene or a mono-olefin to provide the active catalyst of formula II.

Also provided are the catalysts described above. Accordingly, as a further aspect of the invention there is provided a compound of formula II:

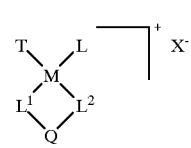

II wherein $L^1$ and $L^2$ are each, independently, a 5- or 6-membered, monodentate N-donor, heterocyclic ring connected to Q at the position adjacent to the donor nitrogen, Q is a group of the formula —C(Y)(Z)— wherein Z is H or a heteroatom connected monoradical and Y is hydrocarbyl or substituted hydrocarbyl;

T is H or hydrocarbyl;

L is a mono-olefin or a neutral Lewis base wherein the coordinated atom is nitrogen, oxygen, or sulfur;

M is Ni(II), Pd(II), Co(II), or Fe(II); and $X^-$ is a weakly coordinating anion.

Also provided is a compound of formula III:

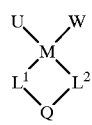

III wherein $L^1$ and $L^2$ are each, independently, a 5- or 6-membered, monodentate N-donor, heterocyclic ring connected to Q at the position adjacent to the donor nitrogen;

Q is a group of the formula —C(Y)(Z)— wherein Z is H or a heteroatom connected monoradical and Y is hydrocarbyl or substituted hydrocarbyl;

U is alkyl, chloride, iodide, or bromide;

W is alkyl, chloride, iodide, or bromide; and

M is Ni(II), Pd(II), Co(II), or Fe(II).

Also provided is a composition comprising (a) a Group 8–10 transition metal M, (b) one or more Lewis acids, and (c) a binucleating or multinucleating compound of the formula I:

I wherein the Lewis acid or acids are bound to one or more heteroatoms which are π-conjugated to the donor atom or atoms bound to the transition metal M;

$L^1$ and $L^2$ are each, independently, a 5- or 6-membered, monodentate N-donor, heterocyclic ring connected to Q at the position adjacent to the donor nitrogen;

Q is a group of the formula —C(Y)(Z)— wherein Z is H or a heteroatom connected monoradical and Y is hydrocarbyl or substituted hydrocarbyl.

In this disclosure certain chemical groups or compounds are described by certain terms and symbols. These terms are defined as follows:

Symbols ordinarily used to denote elements in the Periodic Table take their ordinary meaning, unless otherwise specified. Thus, N, O, S, P, and Si stand for nitrogen, oxygen, sulfur, phosphorus, and silicon, respectively.

Examples of neutral Lewis acids include, but are not limited to, methylaluminoxane (hereinafter MAO) and other aluminum sesquioxides, $R^7{}_3Al$, $R^7{}_2AlCl$, $R^7AlCl_2$ (where $R^7$ is alkyl), organoboron compounds, boron halides, $B(C_6F_5)_3$, $BPh_3$, and $B(3,5\text{-}(CF_3)C_6H_3)_3$. Examples of ionic compounds comprising a cationic Lewis acid include: $R^9{}_3Sn[BF_4]$, (where $R^9$ is hydrocarbyl), $MgCl_2$, and $H^+X^-$, where $X^-$ is a weakly coordinating anion.

Examples of neutral Lewis bases include, but are not limited to, (i) ethers, for example, diethyl ether or tetrahydrofuran, (ii) organic nitriles, for example acetonitrile, (iii) organic sulfides, for example dimethylsulfide, or (iv) monoolefins, for example, ethylene, hexene or cyclopentene.

A "hydrocarbyl" group means a monovalent or divalent, linear, branched or cyclic group which contains only carbon and hydrogen atoms. Examples of monovalent hydrocarbyls include the following: $C_1$–$C_{20}$ alkyl; $C_1$–$C_{20}$ alkyl substituted with one or more groups selected from $C_1$–$C_{20}$ alkyl, $C_3$–$C_8$ cycloalkyl or aryl; $C_3$–$C_8$ cycloalkyl; $C_3$–$C_8$ cycloalkyl substituted with one or more groups selected from $C_1$–$C_{20}$ alkyl, $C_3$–$C_8$ cycloalkyl or aryl; $C_6$–$C_{14}$ aryl; and $C_6$–$C_{14}$ aryl substituted with one or more groups selected from $C_1$–$C_{20}$ alkyl, $C_3$–$C_8$ cycloalkyl or aryl; where the term "aryl" preferably denotes a phenyl, napthyl, or anthracenyl group. Examples of divalent (bridging) hydrocarbyls include: —$CH_2$—, —$CH_2CH_2$—, —$CH_2CH_2CH_2$—, and 1,2-phenylene.

A "heteroatom" refers to an atom other than carbon or hydrogen. Preferred heteroatoms include oxygen, nitrogen, phosphorus, sulfur, selenium, arsenic, chlorine, bromine, silicon and fluorine.

A "substituted hydrocarbyl" refers to a monovalent or divalent hydrocarbyl substituted with one or more heteroatoms. Examples of monovalent substituted hydrocarbyls include: —C(O)$R^{13}$ (wherein $R^{13}$ is hydrocarbyl), —C(O)NR$^{13}{}_2$ (wherein $R^{13}$ is hydrocarbyl), 2-hydroxyphenyl, 2-methoxyphenyl, 2-ethoxyphenyl, 2-fluorophenyl, 2-chlorophenyl, 2-trifluoromethylphenyl, 2,6-bis(trifluoromethyl)phenyl, 2-(trialkylsiloxy)phenyl, 2-(triarylsiloxy)phenyl, 2,6-bis(diphenylamino)phenyl, 2,6-bis(phenoxy)phenyl, 2-hydroxy-6-phenylphenyl, 2-cyanophenyl, 2-(diphenylamino)phenyl, 4-nitrophenyl, 2-nitrophenyl, —$CH_2OR^{13}$ (wherein $R^{13}$ is hydrocarbyl), cyano, —$CH_2NR^{13}{}_2$ (wherein $R^{13}$ is hydrocarbyl), and —$CH_2OSiR^{13}{}_3$ (wherein $R^{13}$ is hydrocarbyl).

A "monodentate N-donor, heterocyclic ring" refers to an aromatic substituted hydrocarbyl ring containing at least one $sp^2$ hybridized nitrogen atom, which provides a single point of coordination to the transition metal M, and which optionally may contain additional heteroatoms which are π-conjugated to the nitrogen that is bound to the transition metal M, in the ring. While not wishing to be bound by theory, the present inventors believe certain Lewis acid cocatalysts (e.g. alkyl aluminum species such as trimethylaluminum or MAO) may coordinate to said additional heteroatoms, thereby rendering the catalysts herein more active or more selective or both. A nonlimiting example of this secondary Lewis acid binding would include the following:

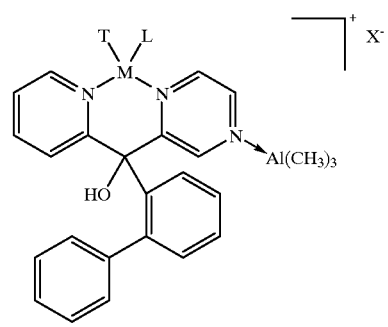

wherein T, L, M, and X are as defined above. Preferred examples of monodentate N-donor heterocyclic rings include:

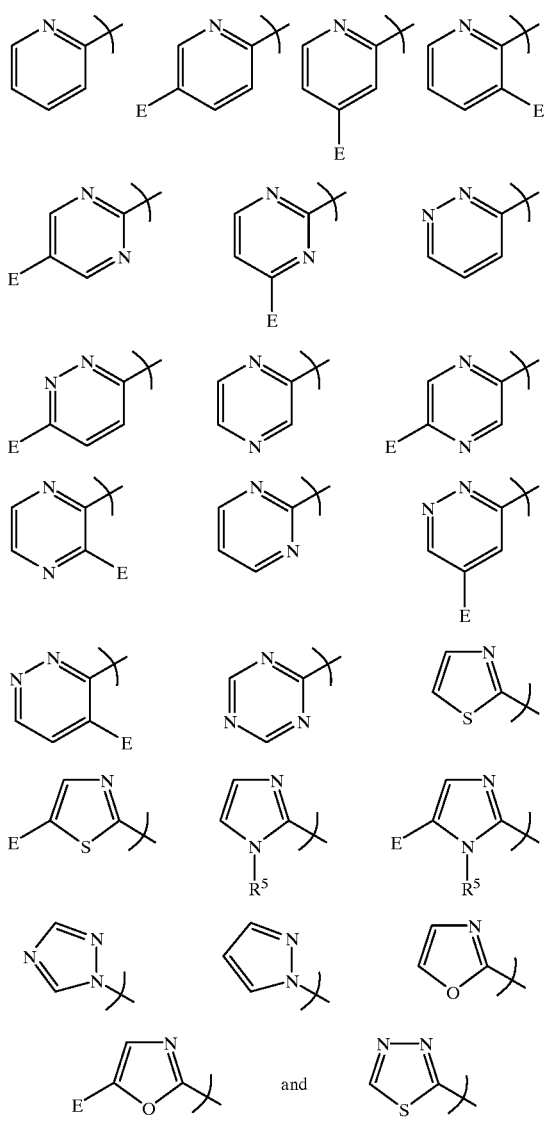

wherein E is selected from H, OCH$_3$, NO$_2$, CN, SO$_2$R$^6$, CO$_2$R$^6$, and CONR$^6{}_2$ where R$^6$ is hydrocarbyl or substituted hydrocarbyl; and, R$^5$ is hydrocarbyl or substituted hydrocarbyl More preferred monodentate N-donor heterocycles include:

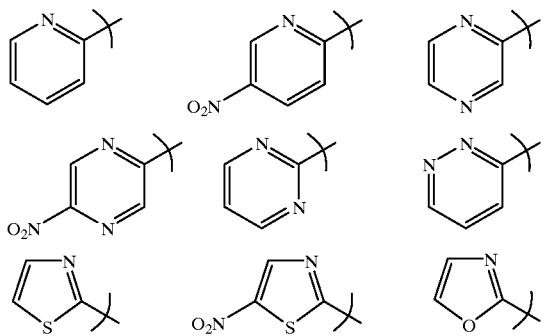

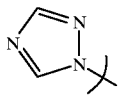

and wherein:
R$^5$ is hydrocarbyl or substituted hydrocarbyl.

A "heteroatom connected monoradical" refers to a monoradical group in which a heteroatom serves as the point of attachment. Examples include: —OH, —O(hydrocarbyl), —O(substituted hydrocarbyl), —O(aluminum), —O(solid support), —N(C$_6$H$_5$)$_2$, —NH(C$_6$H$_5$), —SH, —Cl, —F and SPh, where Ph is phenyl.

A "mono-olefin" refers to a hydrocarbon containing one carbon—carbon double bond.

The term "fluoroalkyl" as used herein refers to a C$_1$–C$_{20}$ alkyl group substituted by one or more fluorine atoms.

The term "polymer" as used herein is meant a species comprised of monomer units and having a degree of polymerization (DP) of ten or higher.

The term "α-olefin" as used herein is a 1-alkene with from 3 to 40 carbon atoms.

The term "weakly coordinating anion" is well-known in the art per se and generally refers to a large bulky anion capable of delocalization of the negative charge of the anion. Suitable weakly coordinating anions include, but are not limited to alkyl aluminates, the anion formed from the reaction of MAO and a halogen ligated metal complex, PF$_6{}^-$, BF$_4{}^-$, SbF$_6{}^-$, (Ph)$_4$B$^-$ wherein Ph=phenyl, and $^-$BAr$_4$ wherein $^-$BAr$_4$=tetrakis[3,5-bis(trifluoromethyl)phenyl]borate. The coordinating ability of such anions is known and described in the literature (Strauss, S. et al., Chem. Rev. 1993, 93, 927).

As used herein, the terms "monomer" or "olefin monomer" refer to the olefin or other monomer compound before it has been polymerized; the term "monomer units" refers to the moieties of a polymer that correspond to the monomers after they have been polymerized.

In some cases, a compound A is required as a cocatalyst. Suitable compounds A include a neutral Lewis acid capable of abstracting Q$^-$ or W$^-$ to form a weakly coordinating anion, a cationic Lewis acid whose counterion is a weakly coordinating anion, or a Bronsted acid whose conjugate base is a weakly coordinating anion. Preferred compounds A include: methylaluminoxane (hereinafter MAO) and other aluminum sesquioxides, R$^7{}_3$Al, R$^7{}_2$AlCl, R$^7$AlCl$_2$ (wherein R$^7$ is alkyl), organoboron compounds, boron halides, B(C$_6$F$_5$)$_3$, R$^9{}_3$Sn[BF$_4$] (wherein R$^9$ is hydrocarbyl), MgCl$_2$, and H$^+$X$^-$, wherein X$^-$ is a weakly coordinating anion.

Examples of "solid support" include inorganic oxide support materials, such as: talcs, silicas, titania, silica/chromia, silica/chromia/titania, silica/alumina, zirconia, aluminum phosphate gels, silanized silica, silica hydrogels, silica xerogels, silica aerogels, and silica co-gels. An especially preferred solid support is one which has been pretreated with A compounds as described herein, most preferably with MAO. Thus, in a preferred embodiment, the catalysts of the present invention are attached to a solid support (by "attached to a solid support" is meant ion paired with a component on the surface, adsorbed to the surface or covalently attached to the surface) which has been pretreated with an A compound. In an especially preferred embodiment, the compounds of the present invention are attached to silica which has been pre-treated with MAO. Such supported catalysts are prepared by contacting the compound, in an inert solvent—by which is meant a solvent which is either unreactive under the conditions of catalyst preparation, or if reactive, acts to usefully modify the catalyst activity or selectivity—with MAO treated silica for a sufficient period of time to generate the supported catalysts. Examples of unreactive solvents include toluene, mineral spirits and hexane. Examples of potentially reactive solvents include $CH_2Cl_2$ and $CHCl_3$.

Thus, in a further preferred embodiment of the invention, there is provided a supported catalyst comprising the reaction product of a compound of formula III

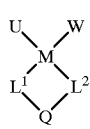

III wherein $L^1$ and $L^2$ are each, independently, a 5- or 6-membered, monodentate N-donor, heterocyclic ring connected to Q at the position adjacent to the donor nitrogen;

Q is a group of the formula —C(Y)(Z)— wherein Z is H or a heteroatom connected monoradical and Y is hydrocarbyl or substituted hydrocarbyl;

U is alkyl, chloride, iodide or bromide;

W is alkyl, chloride, iodide or bromide;

M is Ni(II), Pd(II), Co(II), or Fe(II); and, with a solid support which has been pre-treated with a compound A, wherein A is selected from the group consisting of a neutral Lewis acid capable of abstracting $U^-$ or $W^-$ to form a weakly coordinating anion, a cationic Lewis acid whose counterion is a weakly coordinating anion, and a Bronsted acid whose conjugate base is a weakly coordinating anion.

In general, ligands of formula I can be synthesized by nucleophilic addition of a Grignard reagent, which can be prepared in situ from the corresponding aryl or alkyl bromide and Mg turnings, on a di-heterocyclic ketone. The diheterocyclic ketones can be purchased and used without further purification, or prepared according to the procedure of Newkome, et al. (Newkome, G. R., Joo, Y. J., Evans, D. W., Pappalardo, S., Fronczek, F. R., *J. Org. Chem.* 1988, 53, 786–790) from a heterocyclic substituted acetonitrile, as in the following example (scheme I-mCPBA denotes metachloro perbenzoic acid and DMF denotes N,N-dimethylformamide):

Scheme 1

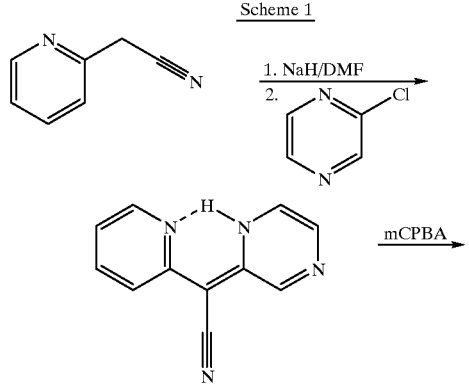

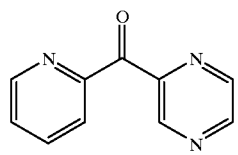

The polymerizations may be conducted as solution polymerizations, as non-solvent slurry type polymerizations, as slurry polymerizations using one or more of the olefins or other solvent as the polymerization medium, or in the gas phase. One of ordinary skill in the art, with the present disclosure, would understand that the catalyst could be supported using a suitable catalyst support and methods known in the art. Substantially inert solvents, such as toluene, hydrocarbons, methylene chloride and the like, may be used. Propylene and 1-butene are excellent monomers for use in slurry-type copolymerizations and unused monomer can be flashed off and reused.

Temperature and olefin pressure have significant effects on copolymer structure, composition, and molecular weight. Suitable polymerization temperatures are preferably from about -100° C. to about 200° C., more preferably in the 20° C. to 150° C. range.

After the reaction has proceeded for a time sufficient to produce the desired polymers, the polymer can be recovered from the reaction mixture by routine methods of isolation and/or purification.

In general, the polymers of the present invention are useful as components of thermoset materials, as elastomers, as packaging materials, films, compatibilizing agents for polyesters and polyolefins, as a component of tackifying compositions, and as a component of adhesive materials.

High molecular weight resins are readily processed using conventional extrusion, injection molding, compression molding, and vacuum forming techniques well known in the art. Useful articles made from them include films, fibers, bottles and other containers, sheeting, molded objects and the like.

Low molecular weight resins are useful, for example, as synthetic waxes and they may be used in various wax coatings or in emulsion form. They are also particularly useful in blends with ethylene/vinyl acetate or ethylene/methyl acrylate-type copolymers in paper coating or in adhesive applications.

Although not required, typical additives used in olefin or vinyl polymers may be used in the new homopolymers and copolymers of this invention. Typical additives include pigments, colorants, titanium dioxide, carbon black, antioxidants, stabilizers, slip agents, flame retarding agents, and the like. These additives and their use in polymer systems are known per se in the art.

The molecular weight data presented in the following examples is determined by gel permeation chromatography (GPC) at 135° C. in 1,2,4-trichlorobenzene using refractive index detection, calibrated using narrow molecular weight distribution poly(styrene) standards.

EXAMPLES

Example 1

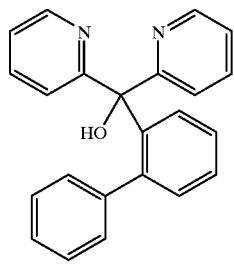

VI

Synthesis of VI: A solution of 2-bromobiphenyl (740 μl, 4.29 mmol) in diethyl ether (Et$_2$O) (4 ml) was slowly added to a suspension of Mg (125 mg, 5.14 mmol) in Et$_2$O (4 ml). A crystal of iodine and 1,2-dibromoethane (70 μl) were added, and the suspension was heated to reflux for 1 hour. The resulting suspension was cooled to room temperature and treated with a solution of di-2-pyridyl ketone (788 mg, 4.28 mmol) in Et$_2$O (8 ml), which resulted in the immediate formation of an orange precipitate. THF (10 ml) was added to dilute the suspension. The reaction was stirred at room temperature overnight, quenched with saturated aqueous NaHCO$_3$ (25 ml) and concentrated in vacuo. The residue was partitioned between H$_2$O (25 ml) and CHCl$_3$ (25 ml). The aqueous layer was further extracted with CHCl$_3$ (2×25 ml). The combined organic layers were washed with saturated aqueous Na$_2$S$_2$O$_3$ (25 ml) and brine (25 ml), dried over Na$_2$SO$_4$, filtered and concentrated in vacuo to afford the tertiary alcohol VI (1.37 g) contaminated with a small amount of 2-dipyridyl ketone: FDMS m/z 338 (M+).

Example 2

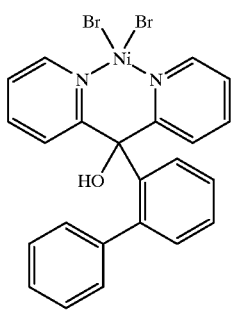

VII

Synthesis of VII: VI (107 mg, 0.32 mmol) was charged to a 50 ml flame dried Sclenk tube, and pumped into an Ar filled dry box. In the box, (dimethoxyethane(DME))NiBr$_2$ (77 mg, 0.25 mmol) was added, the tube was capped with a septum and removed from the box. CH$_2$Cl$_2$ (15 ml) was added via syringe. The reaction was stirred at room temperature overnight, and concentrated under a stream of Ar. The resulting solid was washed with hexanes (2×10 ml), and dried in vacuo to afford VII as a green solid.

Example 3

Ethylene Polymerization with VII: The dibromide complex VII (10 mg. 0.018 mmol) was suspended in toluene (50 ml). The suspension was equilibrated at room temperature under 1 atm of ethylene for 15 min, then treated with methylaluminoxane (MAO) (2 ml, 10 wt % solution in toluene) and stirred vigorously under 1 atm ethylene. The reaction exothermed to ~50° C. After 10 min, the reaction was quenched by the addition of acetone, methanol and 6 N HCl. The toluene layer was separated and concentrated in vacuo to afford 760 mg of polyethylene (9100 TO/hr) (TO/hr=turnovers per hour). $^1$H NMR (300 MHz, CDCl$_3$) ~80–100 branches/1000 C's, $M_n$=4500; gas phase chromatography (GPC) $M_n$=3550, $M_w$=7950.

Example 4

Ethylene Polymerization with VII: The dibromide complex VII (9 mg, 0.016 mmol) was suspended in toluene (50 ml). The suspension was equilibrated at 0° C. in an ice water bath under 1 atm of ethylene, then treated with MAO (2 ml, 10 wt % solution in toluene) and stirred vigorously under 1 atm of ethylene at 0° C. After 2 hr., the reaction was quenched by sequential addition of acetone, methanol and 6 N HCl. The resulting polymer was filtered and dried in vacuo to to afford 1.42 g of polyethylene (1600 TO/hr). $^1$H NMR (400 MHz, o-dichlorobenzene-d$_4$) 41 branches/1000 C's, $M_n$=16,400; GPC $M_n$=13,100, $M_w$=50,700.

Example 5

Ethylene Polymerization with VII: The dibromide complex VII (10 mg, 0.018 mmol) was suspended in toluene (100 ml) in a Fisher pressure bottle. The suspension was equilibrated at 0° C. under 20 psig ethylene for 10 min, then treated with MAO (2 ml, 10 wt % solution in toluene) and stirred vigorously under 60 psig ethylene at 0° C. After 80 min., the reaction was quenched by the sequential addition of acetone, methanol, and 6 N HCl. The resulting polymer was collected by filtration and dried to afford 542 mg of polyethylene (811 TO/hr). $^1$H NMR (400 MHz, o-dichlorobenzene-d$_4$) 15 branches/1000 C's, $M_n$=23,300; GPC $M_n$=15,900, $M_w$=74,200.

Example 6

Ethylene Polymerization with VII: The dibromide complex VII (10 mg, 0.016 mmol) was suspended in toluene (50 ml). The suspension was equilibrated at 0° C. in an ice water bath under 1 atm of ethylene, then treated with MAO (2 ml, 10 wt % solution in toluene) and stirred vigorously under 1 atm of ethylene at 0° C. After 1 hr., the reaction was quenched by sequential addition of acetone, methanol and 6 N HCl. The resulting polymer was filtered and dried in vacuo to afford 944 mg of polyethylene (2100 TO/hr). $^1$H NMR (400 MHz, o-dichlorobenzene-d$_4$) 46 branches/1000 C's, $M_n$=12,860; GPC $M_n$=12,800, $M_w$=39,700.

Example 7

Ethylene Polymerization with VII: The dibromide complex VII (10.5 mg) was suspended in toluene (50 ml). The suspension was equilibrated at room temperature (immersed in a water bath) under 1 atm of ethylene for 10 min, then treated with MAO (2 ml, 10 wt % solution in toluene). The resulting solution was stirred vigorously under 1 atm of ethylene at room temperature for 30 min, then quenched by the sequential addition of acetone, methanol, and 6N HCl. The resulting polymer was filtered and dried in vacuo to afford 878 mg of polyethylene (3300 TO/hr). $^1$H NMR (400 MHz, o-dichlorobenzene-d$_4$) 70 branches/1000 C's, $M_n$=6300; GPC $M_n$=7360, $M_w$=14,400.

Example 8

Ethylene Polymerization with VII: The dibromide complex VII (3 mg, 0.0054 mmol) was charged to a stainless steel Parr® autoclave, which was then evacuated and backfilled with ethylene. Toluene (300 ml) and MAO (2 ml, 10 wt % solution in toluene) were added sequentially with vigorous stirring. The reactor was rapidly pressurized to 600 psig ethylene and heated to ~45° C. Over ~5 min, the pressure reached 800 psig ethylene. After 13 min of vigorous stirring, the rupture valve on the reactor blew, resulting in a loss of ~⅓ of the volume of the reactor. The remaining suspension was filtered and dried in vacuo to afford 1.07 g of polyethylene (48,850 TO/hr based on a loss of 33% of the volume of the reactor). $^1$H NMR (400 MHz, o-dichlorobenzene-d$_4$) 36 branches/1000 C's, $M_n$=9,670; GPC $M_n$=9,730, $M_w$=25,500.

Example 9

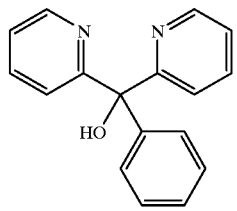

VIII

Synthesis of VIII: A solution of 2-dipyridyl ketone (1 g, 5.43 mmol) in THF (16 ml) was added via cannula with stirring to a solution of phenyl magnesium bromide (5.97 ml, 1 M in THF) in THF (16 ml). The resulting suspension was stirred at room temperature for 18 hr, then quenched with aqueous saturated NH$_4$Cl (25 ml). The volatiles were removed in vacuo and the residue was partitioned between CH$_2$Cl$_2$ (25 ml) and H$_2$O (25 ml). The aqueous layer was further extracted with CH$_2$Cl$_2$ (2×25 ml). The combined organic layers were washed with brine (25 ml) dried over Na$_2$SO$_4$ filtered and concentrated in vacuo to afford an oil, which crystallized on standing. The resulting crystals were filtered, washed with methanol and dried in vacuo to afford VIII (572 mg, 40%) as white crystals: FDMS m/z 262 (M+).

Example 10

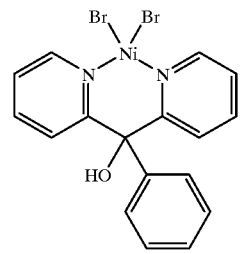

IX

Synthesis of IX: Alcohol VIII (108.5 mg, 0.414 mmol) was charged to a 50 ml Schlenck tube and pumped into an Ar filled glove box. The tube was charged with (DME)NiBr$_2$ (101 mg, 0.331 mmol), capped with a septum and removed from the box. CH$_2$Cl$_2$ (10 ml) was added to the tube and the resulting solution was stirred under Ar overnight. The CH$_2$Cl$_2$ was removed under a stream of Ar, the resulting solid was washed with hexanes (2×10 ml) and dried in vacuo to afford IX as a green solid.

Example 11

Ethylene Polymerization with IX: A suspension of dibromide complex IX (9.5 mg, 0.0196 mmol) in toluene (50 ml) was allowed to equilibrate at 0° C. under 1 atm of ethylene, then treated with MAO (2 ml, 10 wt % solution in toluene). The resulting suspension was stirred vigorously at 0° C. under 1 atm of ethylene for 11 min, then quenched by the sequential addition of acetone, methanol, and 6 N HCl. The resulting polymer was filtered and dried in vacuo to afford 63 mg of polyethylene (690 TO/hr). GPC $M_n$=910. $M_w$=2230.

Example 12

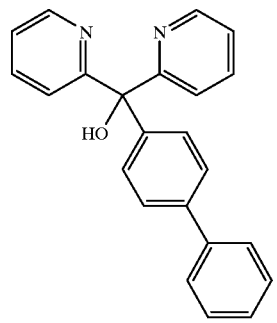

X

Synthesis of X: A 1 ml portion of a solution of 4-bromobiphenyl (900.6 mg, 3.86 mmol) in Et$_2$O (5 ml) and tetrahydrofuran (THF) (1 ml) was added to a suspension of Mg turnings (93.9 mg, 3.86 mmol) in Et$_2$O (5 ml). 1,2-Dibromethane (0.25 ml) was added. After initiation, the remainder of the 4-bromobiphenyl solution was added in 1 ml portions. The reaction was then stirred at room temperature for 1 hr, heated to reflux for 2 hr and cooled to rt. A solution of 2-dipyridyl ketone (741 mg, 4.02 mmol) in Et$_2$O (5 ml) was added, resulting in the immediate formation of a precipitate. Additional THF (5 ml) was added, and the suspension stirred at rt. After 2 hr, the reaction was quenched with saturated aqueous NH$_4$Cl, and extracted with CH$_2$Cl$_2$. The combined organic layers were dried over MgSO$_4$, filtered and concentrated in vacuo to afford X as an oil, which crystallized on standing: FDMS m/z 339 (M+1).

Example 13

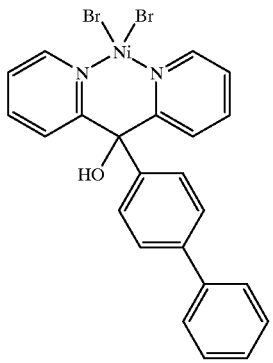

XI

Synthesis of XI: A mixture of (DME)NiBr$_2$ (76 mg, 0.246 mmol) and alcohol X (100 mg, 0.295 mmol) was dissolved in CH$_2$Cl$_2$ (2 ml). The resulting solution was stirred at rt under Ar for 45 min. The CH$_2$Cl$_2$ was removed in vacuo to afford XI as a solid.

Example 14

Ethylene Polymerization with XI: A suspension of dibromide complex XI (11 mg, 0.0197 mmol) in toluene (50 ml) was allowed to equilibrate at 0° C. under 1 atm of ethylene, then treated with MAO (2 ml, 10 wt % solution in toluene). The resulting solution was stirred vigorously at 0° C. under 1 atm of ethylene for 30 min, then quenched by the sequential addition of acetone, ethanol, and 6 N HCl. The resulting polymer was filtered and dried in vacuo to afford 206.5 mg of polyethylene (800 TO/hr). GPC M$_n$=4440, M$_w$=11,200.

Example 15

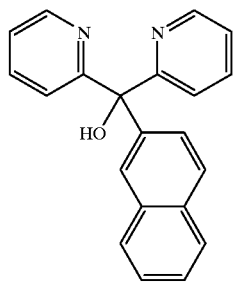

XII

Synthesis of XII: To a stirred room temperature suspension of Mg turnings (97.8 mg, 4.02 mmol) in tetrahydrofuran (5 ml) was added 1,2-dibromoethane (0.15 ml) and a 1 ml portion of a solution of 2-bromonaphthalene (803.2 mg, 3.88 mmol) in tetrahydrofuran (5 ml). The suspension was warmed slightly to initiate the reaction then the rest of the 2-bromonaphthalene solution was added in 1 ml portions over 20 min. The reaction was heated at reflux for an additional 20 min, then cooled to room temperature and treated with a solution of 2-dipyridyl ketone (715 mg, 3.88 mmol) in tetrahydrofuran (5 ml). The resulting suspension was stirred at room temperature for 50 min and at reflux for 15 min, after which it was cooled to room temperature and quenched with aq. saturated NH$_4$Cl and extracted with Et$_2$O. The combined organic layers were dried over MgSO$_4$, filtered and dried in vacuo. The residue was chromatographed (SiO$_2$, 3/1 hexane/ethyl acetate) to afford XII (195.6 mg, 16%): R$_f$ 0.24 (3/1 hexane/ethyl acetate); FDMS m/z 312 (M+).

Example 16

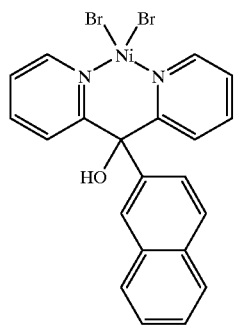

XIII

Synthesis of XIII: A solution of XII (97.8 mg, 0.31 mmol) in CH$_2$Cl$_2$ (10 ml) was added to dry (DME)NiBr$_2$ (90.0 mg, 0.294 mmol) under nitrogen at room temperature. The resulting solution was stirred at room temperature for 45 min., then concentrated in vacuo to afford XIII as a green powder.

Example 17

Ethylene Polymerization with XIII: A suspension of dibromide complex XIII (11 mg, 0.020 mmol) in toluene (50 ml) was allowed to equilibrate at 0° C. under 1 atm of ethylene, then treated with MAO (2 ml, 10 wt % solution in toluene). The resulting solution was stirred vigorously at 0° C. under 1 atm of ethylene for 30 min, then quenched by the sequential addition of acetone, methanol, and 6 N HCl. The resulting polymer was filtered and dried in vacuo to afford 160.8 mg of polyethylene (575 TO/hr). GPC M$_n$=4180, M$_w$=16,600.

Example 18

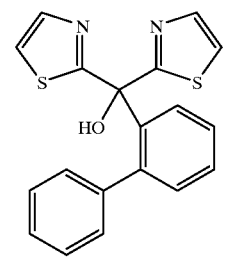

XIV

Synthesis of XIV: To a stirred suspension of Mg turnings (488 mg, 20 mmol) in Et$_2$O (2.6 ml) was added a 0.20 ml portion of a solution of 2-bromothiazole (0.458 ml, 5.1 mmol) in 1,2-dibromoethane (1.32 ml, 15 mmol). The resulting suspension was stirred at room temperature for 30 min. The remainder of the 2-bromothiazole solution was added in 0.10 ml portions at a rate such that a gentle reflux was maintained. After the final addition, the reaction was stirred at room temperature for 30 min, then treated with a solution of 2-phenyl ethyl benzoate (0.524 ml, 2.55 mmol) in Et$_2$O (4 ml). The resulting suspension was stirred at room temperature for 3.5 hr, then quenched with aqueous saturated NH₄Cl (25 ml) and extracted with CH₂Cl₂ (2×25 ml). The combined organic layers were dried over Na₂SO₄, filtered and concentrated in vacuo. The residue was flash chromatographed (SiO₂, 12% ethyl acetate/hexanes followed by 25% ethyl acetate/hexanes) to afford XIV (143 mg, 1.6%): $R_f$ 0.07 (12% ethyl acetate/hexanes).

Example 19

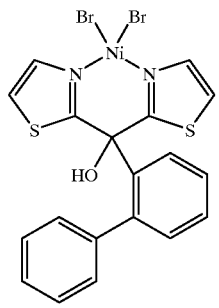

XV

Synthesis of XV: To (DME)NiBr₂ (100 mg, 0.33 mmol) was added a solution of XIV (143 mg, 0.41 mmol) in CH₂Cl₂ (19 ml). The resulting solution was stirred at room temperature for 1.5 hr. The solvent was removed under a stream of Ar and the residue was dried in vacuo to afford XV as a brown/green solid.

Example 20

Ethylene polymerization with XV: A suspension of dibromide complex XV (10.8 mg, 0.019 mmol) in toluene (50 ml) was allowed to equilibrate at 0° C. under 1 atm of ethylene, then treated with MAO (2 ml, 10 wt % solution in toluene). The resulting solution was stirred vigorously at 0° C. under 1 atm of ethylene for 200 min, then quenched by the sequential addition of acetone, methanol, and 6 N HCl. The resulting polymer was filtered and dried in vacuo to afford 243.9 mg of polyethylene (138 TO/hr). GPC $M_n$ 860, $M_w$=3080.

Example 21

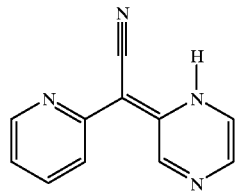

XVI

Synthesis of XVI: A solution of 2-pyridylacetonitrile (0.472 ml, 4.23 mmol) in DMF (41 ml) was treated with NaH (677 mg, 17 mmol, 60% dispersion in mineral oil) and stirred under Ar for 30 min. The resulting suspension was treated with chloropyrazine (0.378 ml, 4.23 mmol) and heated to 90° C. for 5 hr. The reaction was then cooled to room temperature, quenched with H₂O (100 ml) and extracted with CH₂Cl₂ (2×100 ml). The combined organic layers were dried over Na₂SO₄, filtered and concentrated in vacuo. The residue was flash chromatographed (SiO₂, 4% methanol/CH₂Cl₂) to afford XVI (713.9 mg, 86%): $R_f$ 0.5 (4% methanol/CH₂Cl₂); FDMS m/z 196 (M+).

Example 22

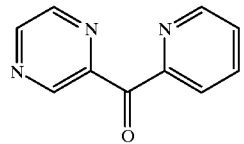

XVII

Synthesis of XVII: An ice cold solution of XVI (215 mg, 1.1 mmol) in CHCl₃ (48 ml) was treated with 3-chloroperoxybenzoic acid (387 mg, 1.6 mmol). The resulting solution was stirred overnight, allowing the ice bath to expire, then quenched with 0.5 M NaOH (50 ml). The organic layer was removed and washed with brine (50 ml). The combined aqueous layers were further extracted with CH₂Cl₂ (2×40 ml). The combined organic layers were dried over Na₂SO₄, filtered and concentrated in vacuo to afford XVII (169.1 mg, 83%) as a yellow solid: FDMS m/z 185 (M+).

Example 23

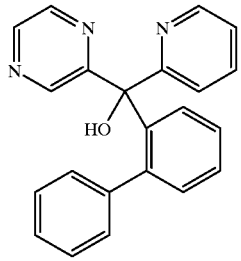

XVIII

Synthesis of XVIII: A suspension of Mg turnings (12 mg, 0.49 mmol) in Et₂O (0.5 ml) was treated with a 0.25 ml portion of a solution of 2-bromobiphenyl (0.0591 ml 0.343 mmol) in Et₂O (0.5 ml) and 1,2-dibromoethane (0.006 ml). After initiation, the remaining 2-bromobiphenyl solution was added, and the suspension heated at reflux for 1 hr. The resulting suspension was cooled to room temperature, and treated with a solution of XVII (63.4 mg, 0.343 mmol) in Et₂O (0.5 ml) and THF (1.0 ml). The suspension was stirred under Ar at room temperature for 1 hr, then quenched with aqueous saturated NH₄Cl (10 ml) and extracted with CH₂Cl₂ (2×10 ml). The combined organic layers were dried over Na₂SO₄, filtered and concentrated in vacuo. The residue was flash chromatographed (SiO₂, 20% ethyl acetate/hexanes followed by 40% ethyl acetate/hexanes) to afford XVIII (25 mg, 22%): $R_f$ 0.58 (50% ethyl acetate/hexanes); FDMS m/z 339 (M+).

Example 24

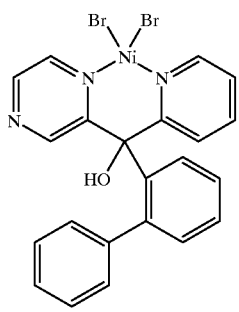

Synthesis of XIX: To (DME)NiBr$_2$ (18 mg, 0.0588 mmol) was added a solution of XVIII (25 mg, 0.074 mmol) in CH$_2$Cl$_2$ (5 ml). The resulting solution was stirred at room temperature under Ar for 30 min, then concentrated in vacuo to afford XIX as a green solid.

Example 25

Ethylene Polymerization with XIX: A solution of dibromide complex XIX (9.0 mg, 0.016 mmol) in toluene (100 ml) was allowed to equilibrate at 0° C. under 1 atm of ethylene, then treated with MAO (4 ml, 10 wt % solution in toluene). The resulting solution was stirred vigorously at 0° C. under 1 atm of ethylene for 30 min, then quenched by the sequential addition of acetone, methanol, and 6 N HCl. The resulting polymer was filtered and dried in vacuo to afford 1.13 g of polyethylene (5,027 TO/hr). $^1$H NMR (400 MHz, o-dichlorobenzene-d$_4$) 7 branches/1000 C's, M$_n$=13,700; GPC M$_n$=15,700, M$_w$=127,900.

Example 26

Ethylene Polymerization with XIX: A solution of dibromide complex XIX (7.0 mg, 0.0125 mmol) in toluene (100 ml) was allowed to equilibrate at 23° C. under 1 atm of ethylene, then treated with MAO (4 ml, 10 wt % solution in toluene). The resulting solution was stirred vigorously at 23° C. under 1 atm of ethylene for 15 min, then quenched by the sequential addition of acetone, methanol, and 6 N HCl. The resulting polymer was filtered and dried in vacuo to afford 600.3 mg of polyethylene (6860 TO/hr). $^1$H NMR (400 MHz, o-dichlorobenzene-d$_4$) 28 branches/1000 C's; GPC M$_n$=5750, M$_w$=66,300.

We claim:

1. A process for the polymerization of olefins, comprising contacting one or more monomers selected from compounds of the formula R$^1$CH=CHR$^2$ with a catalyst comprising (a) a Ni(II), Pd(II), Co(II), or Fe(II) metal atom, (b) a ligand of the formula I, and optionally (c) a Bronsted or Lewis acid,

I wherein R$^1$ and R$^2$ are each, independently, hydrogen, hydrocarbyl, or fluoroalkyl, and may be linked to form a cyclic olefin;

L$^1$ and L$^2$ are each, independently, a 5- or 6-membered, monodentate N-donor, heterocyclic ring connected to Q at the position adjacent to the donor nitrogen; and Q is a group of the formula —C(Y)(Z)— wherein Z is H or a heteroatom connected monoradical and Y is hydrocarbyl or substituted hydrocarbyl.

2. The process of claim 1 wherein the metal atom is Ni(II).

3. The process of claim 2 wherein Z is —OH, —SH, —OR$^3$, —OAlR$^4_2$, —OSiR$^4_3$, —O(silica surface), —O(methylaluminoxane), —OB(OR$^4$)$_2$, —SR$^4$, or —NR$^4_2$, where R$^3$ is hydrocarbyl or substituted hydrocarbyl and R$^4$ is hydrocarbyl or substituted hydrocarbyl.

4. The process of claim 3 wherein L$^1$ and L$^2$ are each, independently, selected from the group consisting of:

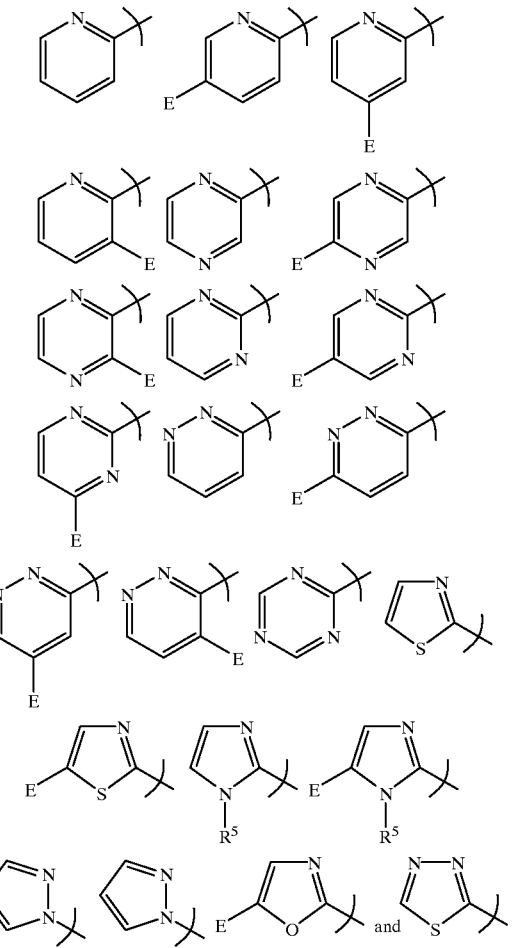

wherein:

E is selected from the group consisting of H, —OCH$_3$, —NO$_2$, —CN, —SO$_2$R$^6$, —CO$_2$R$^6$, and —CONR$^6_2$ where R$^6$ is hydrocarbyl or substituted hydrocarbyl; and, R$^5$ is hydrocarbyl or substituted hydrocarbyl.

5. The process of claim 4, wherein L$^1$ and L$^2$ are each, independently, selected from the group consisting of:

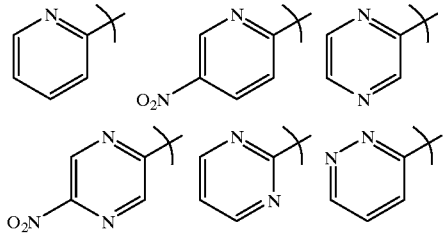

-continued

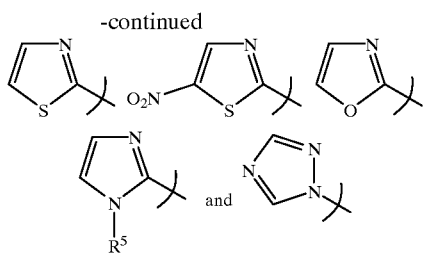

wherein:

R⁵ is hydrocarbyl or substituted hydrocarbyl.

6. The process of claim 5, wherein Y is selected from the group consisting of:

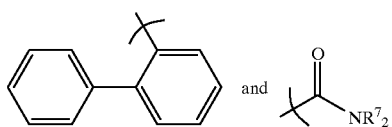

wherein R⁷ is hydrocarbyl or substituted hydrocarbyl.

7. The process of claim 2, wherein the ligand of formula I is

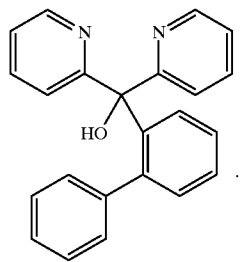

8. The process of claim 2, wherein the ligand of formula I is

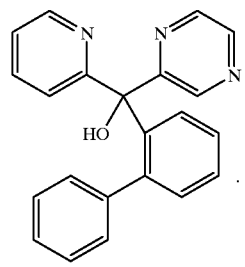

9. A process for the polymerization of olefins, comprising contacting one or more monomers of the formula $R^1CH=CHR^2$ with a catalyst of formula II:

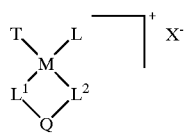

II wherein $R^1$ and $R^2$ are each, independently, hydrogen, hydrocarbyl, or fluoroalkyl, and may be linked to form a cyclic olefin;

$L^1$ and $L^2$ are each, independently, a 5- or 6-membered, monodentate N-donor, heterocyclic ring connected to Q at the position adjacent to the donor nitrogen;

Q is a group of the formula —C(Y)(Z)— wherein Z is H or a heteroatom connected monoradical and Y is hydrocarbyl or substituted hydrocarbyl;

T is hydrogen or hydrocarbyl;

L is a mono-olefin or a neutral Lewis base wherein the coordinated atom is nitrogen, oxygen, or sulfur;

M is Ni(II), Pd(II), Co(II), or Fe(II); and

X⁻ is a weakly coordinating anion.

10. The process of claim 9 wherein M is Ni(II).

11. The process of claim 10 wherein Z is —OH, —SH, —OR³, —OAlR⁴₂, —OSiR⁴₃, —O(silica surface), —O(methylaluminoxane), —OB(OR⁴)₂, —SR⁴, or —NR⁴₂, where R³ is hydrocarbyl or substituted hydrocarbyl and R⁴ is hydrocarbyl or substituted hydrocarbyl.

12. The process of claim 10 wherein $L^1$ and $L^2$ are each, independently, selected from the group consisting of:

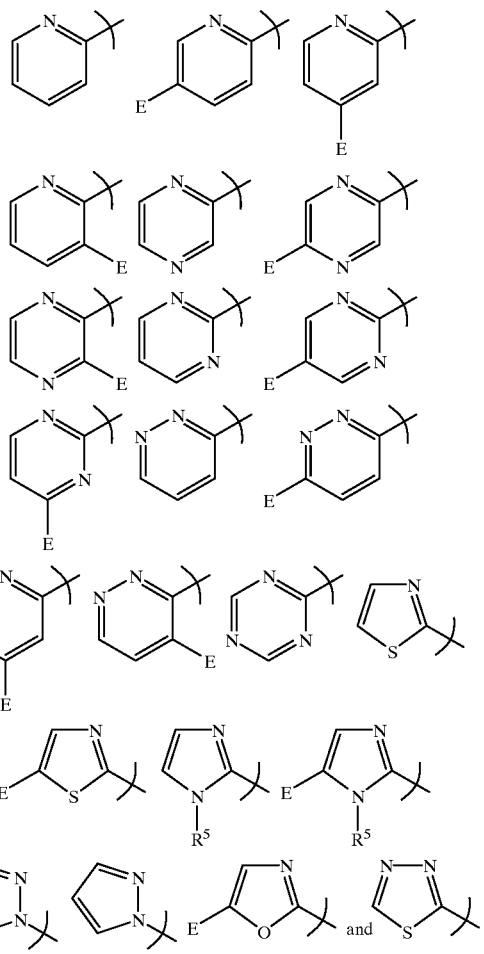

wherein:

E is selected from H, —OCH₃, —NO₂, —CN, —SO₂R⁶, —CO₂R⁶, and —CONR⁶₂ where R⁶ is hydrocarbyl or substituted hydrocarbyl; and, R⁵ is hydrocarbyl or substituted hydrocarbyl.

13. The process of claim 12, wherein $L^1$ and $L^2$ are each, independently, selected from the group consisting of:

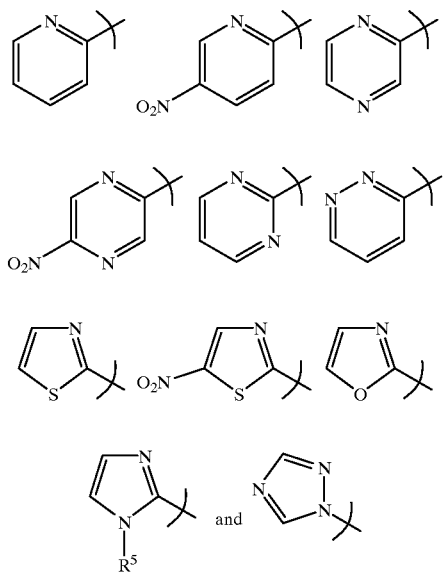

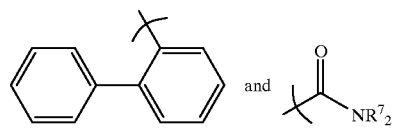

wherein $R^5$ is hydrocarbyl or substituted hydrocarbyl.

14. The process of claim 13 wherein Y is selected from the group consisting of:

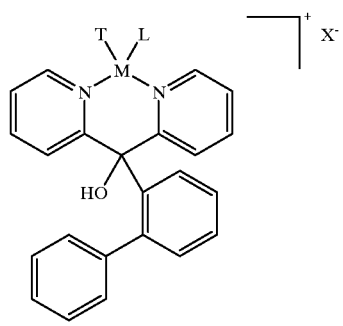

wherein $R^7$ is hydrocarbyl or substituted hydrocarbyl.

15. The process of claim 14, wherein the catalyst of formula II is

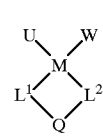

wherein:

T is hydrogen or hydrocarbyl;

L is a mono-olefin or a neutral Lewis base wherein the coordinated atom is nitrogen, oxygen, or sulfur;

M is Ni(II); and $X^-$ is a weakly coordinating anion.

16. The process of claim 14, wherein the catalyst of formula II is

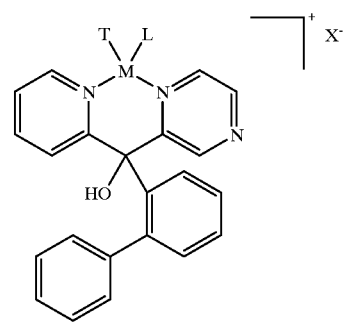

wherein:

T is hydrogen or hydrocarbyl;

L is a mono-olefin or a neutral Lewis base wherein the coordinated atom is nitrogen, oxygen, or sulfur;

M is Ni(II); and $X^-$ is a weakly coordinating anion.

17. A process for the polymerization of olefins, comprising contacting one or more monomers of the formula $R^1CH=CHR^2$ with a catalyst formed by combining a compound of formula III:

$$\underset{L^1 \diagup \underset{Q}{M} \diagdown L^2}{U \diagdown M \diagup W} \qquad \text{III}$$

with a compound A, wherein $R^1$ and $R^2$ are each, independently, H, hydrocarbyl, or fluoroalkyl, and may be linked to form a cyclic olefin;

$L^1$ and $L^2$ are each, independently, a 5- or 6-membered, monodentate N-donor, heterocyclic ring connected to Q at the position adjacent to the donor nitrogen;

Q is a group of the formula —C(Y)(Z)— wherein Z is H or a heteroatom connected monoradical and Y is hydrocarbyl or substituted hydrocarbyl;

U is alkyl, chloride, iodide or bromide;

W is alkyl, chloride, iodide or bromide;

M is Ni(II), Pd(II), Co(II), or Fe(II); and,

A is selected from the group consisting of a neutral Lewis acid capable of abstracting $U^-$ or $W^-$ to form a weakly coordinating anion, a cationic Lewis acid whose counterion is a weakly coordinating anion, and a Bronsted acid whose conjugate base is a weakly coordinating anion.

18. The process of claim 17 wherein M is Ni(II).

19. The process of claim 18 wherein Z is —OH, —SH, —$OR^3$, —$OAlR^4_2$, —$OSiR^4_3$, —O(silica surface), —O(methylaluminoxane), —$OB(OR^4)_2$, —$SR^4$, or —$NR^4_2$, where $R^3$ is hydrocarbyl or substituted hydrocarbyl and $R^4$ is hydrocarbyl or substituted hydrocarbyl.

20. The process of claim 19 wherein $L^1$ and $L^2$ are each, independently, selected from the group consisting of:

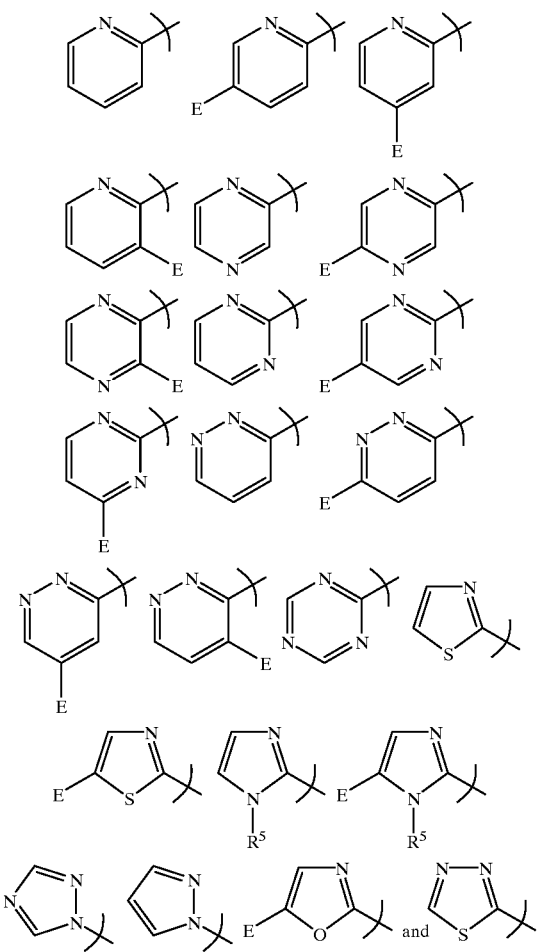

wherein:

E is selected from H, —OCH$_3$, —NO$_2$, —CN, —SO$_2$R$^6$, —CO$_2$R$^6$, and —CONR$^6{}_2$ where R$^6$ is hydrocarbyl or substituted hydrocarbyl, and, R$^5$ is hydrocarbyl or substituted hydrocarbyl.

21. The process of claim 20, wherein $L^1$ and $L^2$ are each, independently, selected from the group consisting of:

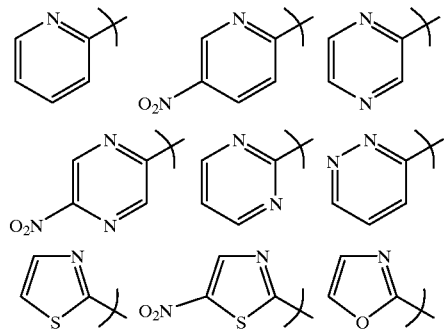

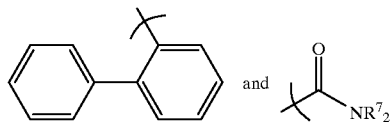

wherein R$^5$ is hydrocarbyl or substituted hydrocarbyl.

22. The process of claim 21, wherein Y is selected from the group consisting of:

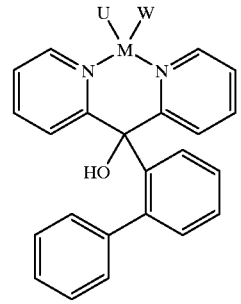

wherein R$^7$ is hydrocarbyl or substituted hydrocarbyl.

23. The process of claim 22, wherein the compound of formula III is

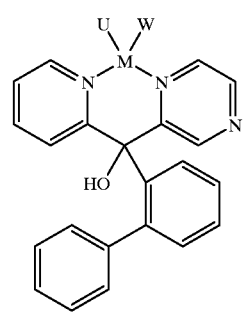

wherein

U is alkyl, chloride, iodide or bromide;

W is alkyl, chloride iodide or bromide; and,

M is Ni(II).

24. The process of claim 22, wherein the compound of formula IV is

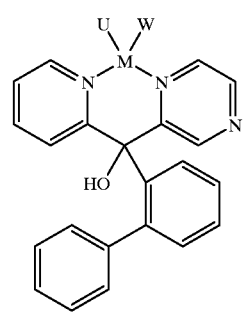

wherein

U is alkyl, chloride, iodide or bromide;

W is alkyl, chloride, iodide or bromide; and,

M is Ni(II).

25. The process of claim 1 wherein the catalyst is attached to a solid support.

26. The process of claim 25, wherein the solid support is silica.

27. The process of claim 25, wherein the solid support is silica which has been pre-treated with a compound selected from the group consisting of methylaluminoxane and other aluminum sesquioxides having the formulas $R^7_3Al$, $R^7_2AlCl$, and $R^7AlCl_2$, wherein $R^7$ is alkyl.

28. The process of claim 25, wherein the solid support is silica which has been pre-treated with methylaluminoxane and the metal is Ni(II).

29. The process of claim 9 wherein the catalyst is attached to a solid support.

30. The process of claim 29, wherein the solid support is silica.

31. The process of claim 30, wherein the solid support is silica which has been pre-treated with a compound selected from the group consisting of methylaluminoxane and other aluminum sesquioxides having the formulas $R^7_3Al$, $R^7_2AlCl$, and $R^7AlCl_2$, wherein $R^7$ is alkyl.

32. The process of claim 29, wherein the solid support is silica which has been pre-treated with methylaluminoxane and the metal is Ni(II).

33. The process of claim 17 wherein the catalyst is attached to a solid support.

34. The process of claim 33, wherein the solid support is silica.

35. The process of claim 33 wherein the solid support is silica which has been pre-treated with a compound selected from the group consisting of methylaluminoxane and other aluminum sesquioxides having the formulas $R^7_3Al$, $R^7_2AlCl$, and $R^7AlCl_2$, wherein $R^7$ is alkyl.

36. The process of claim 33, wherein the solid support is silica which has been pre-treated with methylaluminoxane and the metal is Ni(II).

* * * * *

UNITED STATES PATENT AND TRADEMARK OFFICE
CERTIFICATE OF CORRECTION

PATENT NO.   : 6,117,959
DATED        : September 12, 2000
INVENTOR(S)  : James Allen Ponasik, Jr. et al.

It is certified that error appears in the above-identified patent and that said Letters Patent is hereby corrected as shown below:

Column 20, lines 42-45; Column 22, lines 56-60 and Column 25, lines 36-40,
The following structure should appear after the second structure from the left:

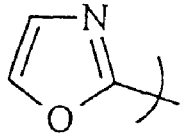

Signed and Sealed this

Twenty-seventh Day of August, 2002

*Attest:*

*Attesting Officer*

JAMES E. ROGAN
*Director of the United States Patent and Trademark Office*